US011413926B2

(12) United States Patent
Hamamoto et al.

(10) Patent No.: US 11,413,926 B2
(45) Date of Patent: Aug. 16, 2022

(54) STABILIZER MANUFACTURING DEVICE AND METHOD FOR MANUFACTURING STABILIZER

(71) Applicant: NHK SPRING CO., LTD., Yokohama (JP)

(72) Inventors: Akitoshi Hamamoto, Yokohama (JP); Yasuhiko Kogetsu, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 196 days.

(21) Appl. No.: 16/944,224

(22) Filed: Jul. 31, 2020

(65) Prior Publication Data
US 2022/0032721 A1 Feb. 3, 2022

(51) Int. Cl.
*B60G 21/055* (2006.01)
*F16F 1/14* (2006.01)

(52) U.S. Cl.
CPC .............. *B60G 21/055* (2013.01); *F16F 1/14* (2013.01); *B60G 2202/135* (2013.01);
(Continued)

(58) Field of Classification Search
CPC ............ B60G 21/055; B60G 2202/135; B60G 2206/427; B60G 2206/8103; B60G 2206/81035; B60G 2206/8109; F16F 1/14; F16F 2226/04; B21D 7/00; B21D 9/00; B21D 9/04; B21D 9/05; B21D 9/10;
(Continued)

(56) References Cited

U.S. PATENT DOCUMENTS 4,781,054 A * 11/1988 Brown ................. B60G 21/055
72/383
8,307,685 B2 * 11/2012 Heinz ...................... B21D 7/08
72/168

(Continued)

FOREIGN PATENT DOCUMENTS

JP 2004009125 A 1/2004
JP 2010228555 A 10/2010
(Continued)

OTHER PUBLICATIONS

International Search Report (ISR) (and English language translation thereof) and Written Opinion dated Aug. 31, 2021, issued in International Application No. PCT/JP2021/027714.

Primary Examiner — Jonathan Ng
Assistant Examiner — Daniel M. Keck
(74) Attorney, Agent, or Firm — Holtz, Holtz & Volek PC

(57) ABSTRACT

According to one embodiment, a stabilizer manufacturing device includes a first forming unit and a second forming unit. The first forming unit includes a first forming mandrel, a holding member and a first bending roller. The first forming mandrel includes a first forming portion having an arc shape when viewed from above, and a support portion which supports a workpiece. The first bending roller moves along the first forming portion. The second forming unit includes a second forming mandrel, a holding member and a second bending roller. The second forming mandrel includes a second forming portion having an arc shape when viewed from above, and a support portion which supports the workpiece. The second bending roller moves along the second forming portion.

11 Claims, 11 Drawing Sheets

(52) U.S. Cl.
CPC .............. *B60G 2206/427* (2013.01); *B60G 2206/8109* (2013.01); *B60G 2206/81035* (2013.01)

(58) Field of Classification Search
CPC ... B21D 9/12; B21D 9/18; B62D 7/16; C21D 9/08; C21D 9/085
See application file for complete search history.

(56) References Cited

U.S. PATENT DOCUMENTS

| | | | |
|---|---|---|---|
| 10,995,382 B2 * | 5/2021 | Kuwatsuka | ............... F16F 1/14 |
| 2012/0169022 A1 | 7/2012 | Schulz et al. | |

FOREIGN PATENT DOCUMENTS

| | | | | |
|---|---|---|---|---|
| JP | 2011235323 A | 11/2011 | | |
| JP | 2018047909 A | 3/2018 | | |
| WO | 2011029434 A1 | 3/2011 | | |
| WO | WO-2019097198 A1 * | 5/2019 | ............. | B21D 53/88 |

* cited by examiner

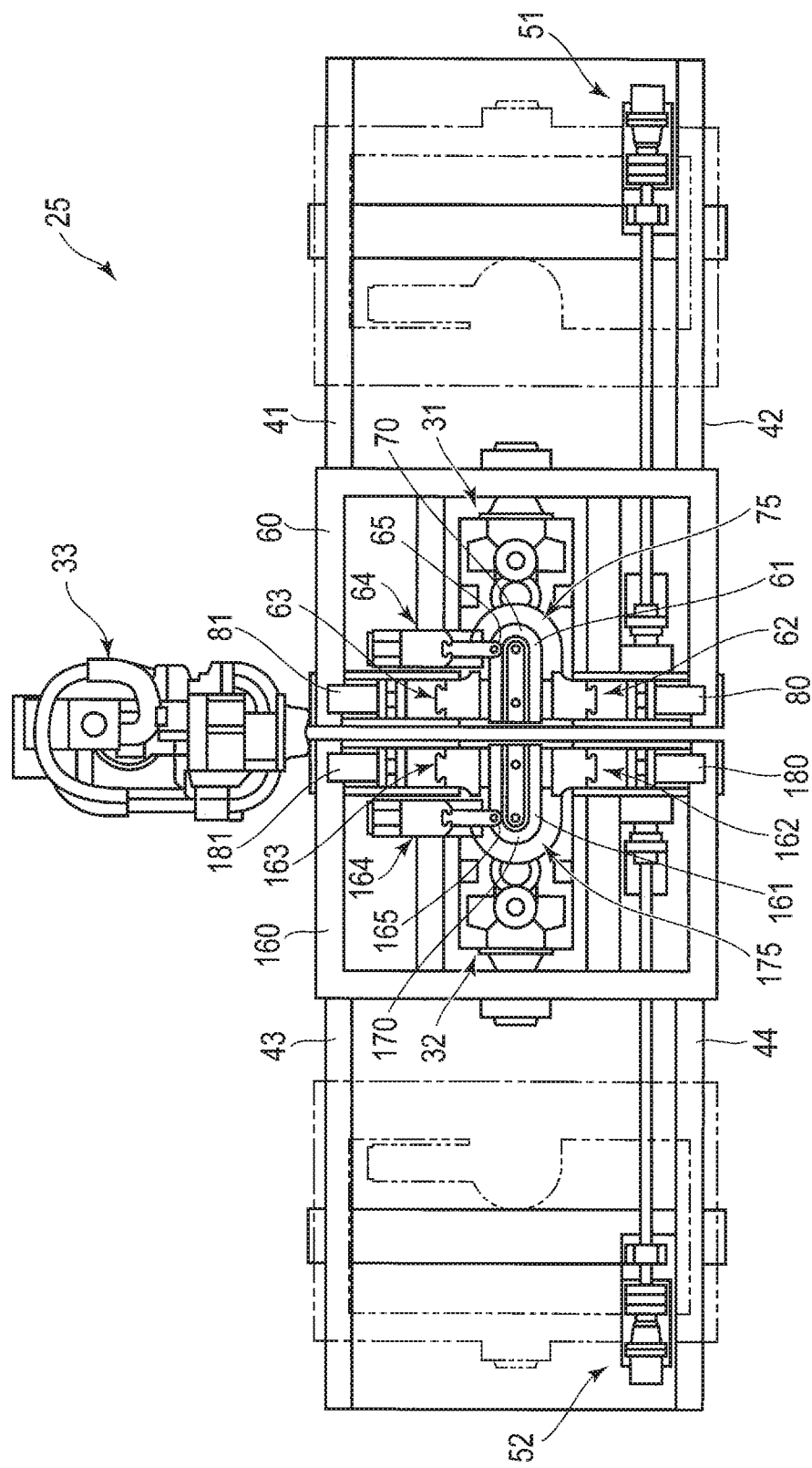
F I G. 6

STABILIZER MANUFACTURING DEVICE AND METHOD FOR MANUFACTURING STABILIZER

BACKGROUND OF THE INVENTION

1. Field of the Invention

The present invention relates to a device for manufacturing, for example, a vehicle stabilizer and a method for manufacturing the stabilizer.

2. Description of the Related Art

A stabilizer arranged in a suspension mechanism portion of a vehicle includes a torsion portion extending in a width direction of the vehicle, a pair of arm portions continuous with both ends of the torsion portion, a plurality of bent portions, and the like. For example, in the suspension mechanism portion, the torsion portion is supported on a vehicle body, and the arm portions are connected to suspension arms or the like.

In order to manufacture a stabilizer formed of a steel rod, a steel pipe or the like, the heated material is bent into a desired shape. For example, in a solid stabilizer, a portion to be bent of the material heated to high temperature (for example, greater than or equal to 960° C.) is pressed and bent by a die. However, a part of the surface of the stabilizer which contacts the die may be scratched. In addition, since the material is heated to high temperature, scales may be formed on the surface of the material. This is undesirable because, when the material having scales is pressed and bent by the die, so-called scale defects are made in a part of the material having scales. In addition, this is problematic because, when the material is maintained at high temperature for a long time, decarburization occurs.

In the case of a hollow stabilizer, as disclosed in, for example, JP 2004-009125 A, a pipe bender may be used. For example, in the pipe bender, a material is bent by a roller while the material is being pulled. However, the pipe bender may cause a problem in the cross-sectional shape of a bent portion. Bending of the material using a die instead of the pipe bender is also considered. However, when the material is pressed and bend by the die, not only is the surface of the material scratched but also the cross-section of the bent portion may be flattened. As described in WO 2011/029434 A, accommodation of the molten material in a cavity of the die and curing of the material inside the die are proposed. However, a steel stabilizer cannot be manufactured by this method.

BRIEF SUMMARY OF THE INVENTION

The present invention aims to provide a stabilizer manufacturing device which can bend bent portions without scratching a surface of a stabilizer, and a method for manufacturing the stabilizer.

According to one embodiment, there is provided a stabilizer manufacturing device including a first forming unit and a second forming unit. The first forming unit includes a first forming mandrel, a first front holding member, a first rear holding member and a first bending roller. The first forming mandrel includes a first forming portion having an arc shape when viewed from above, a front support portion which supports a workpiece between the front support portion and the first front holding member, and a rear support portion which supports the workpiece between the rear support portion and the first rear holding member. When the workpiece is bent in a first direction, the workpiece is clamped between the first front holding member and the first forming mandrel. In addition, the workpiece is clamped between the second front holding member and the second forming mandrel. When the workpiece is bent in a second direction, the workpiece is clamped between the first rear holding member and the first forming mandrel. In addition, the workpiece is clamped between the second rear holding member and the second forming mandrel. The first bending roller revolves along the first forming portion. The second bending roller revolves along the second forming portion.

In the present specification, a front side of the forming mandrel is a side on which the workpiece is arranged with respect to the forming mandrel when the workpiece is bent in the first direction. A rear side of the forming mandrel is a side on which the workpiece is arranged with respect to the forming mandrel when the workpiece is bent in the second direction.

The second forming unit includes a second forming mandrel, a second front holding member, a second rear holding member and a second bending roller. The second forming mandrel includes a second forming portion having an arc shape when viewed from above, a front support portion which supports the workpiece between the front support portion and the second front holding member, and a rear support portion which supports the workpiece between the second rear support portion and the second rear holding member.

It is preferable that the first forming mandrel and the second forming mandrel should be bilaterally symmetrical. It is also preferable that the first forming unit and the second forming unit should be movable along guide members extending in a horizontal direction, and the stabilizer manufacturing device of the embodiment should include a first unit drive mechanism for moving the first forming unit and a second unit drive mechanism for moving the second forming unit.

In the stabilizer manufacturing device of the embodiment, the first forming portion may have a large-diameter arc-shaped surface having a first radius of curvature, and a small-diameter arc-shaped surface having a second radius of curvature less than the first radius of curvature, the second forming portion may have a large-diameter arc-shaped surface having the first radius of curvature, and a small-diameter arc-shaped surface having the second radius of curvature. In the stabilizer manufacturing device of the embodiment, the first forming mandrel and the second forming mandrel are movable in a vertical direction. The stabilizer manufacturing device of the embodiment further includes a first lifting/lowering mechanism which moves the first forming mandrel so that the large-diameter arc-shaped surface or the small-diameter arc-shaped surface of the first forming mandrel is located at a same height as the first bending roller, and a second lifting/lowering mechanism which moves the second forming mandrel so that the large-diameter arc-shaped surface or the small-diameter arc-shaped surface of the second forming mandrel is located at a same height as the second bending roller.

According to another embodiment, there is provided a method for manufacturing a stabilizer. A steel workpiece as a material of the stabilizer is heated to a temperature suitable for warm working (less than an A1 point). The heated workpiece is set to a forming mandrel having an arc-shaped forming portion, and the workpiece is fixed to the forming mandrel by a holding member. The forming portion includes a plurality of arc-shaped surfaces having different radii of curvature. A rotatable bending roller is moved along an arc-shaped surface selected from among the arc-shaped surfaces, and the workpiece is thereby bent to a radius of curvature corresponding to the selected arc-shaped surface. The bent workpiece is reheated to a temperature at which quenching can be carried out by, for example, electric current heating (or a furnace), and the reheated workpiece is put and cooled in a coolant (for example, water) and is thereby quenched. The coolant may be an oil or another liquid.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a plan view of the stabilizer manufacturing device.

DETAILED DESCRIPTION OF THE INVENTION

A stabilizer manufacturing device and a stabilizer manufacturing method according to one embodiment will be described with reference to FIGS. 1 to 16.

Figure 1:
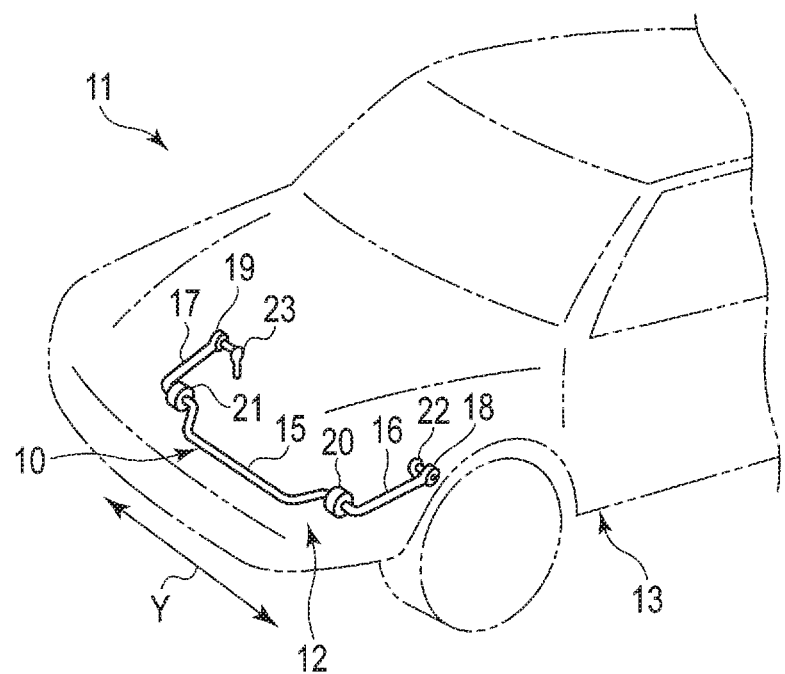
FIG. 1 is a perspective view showing a part of a vehicle and a stabilizer.

FIG. 1 shows a part of a vehicle 11 including a stabilizer 10. The stabilizer 10 is arranged in a suspension mechanism portion 12 of the vehicle 11. The stabilizer 10 includes a torsion portion 15 extending in a width direction of a vehicle body 13 (direction indicated by a two-headed arrow Y in FIG. 1), and a pair of arm portions 16 and 17 continuous with both ends of the torsion portion 15. At distal ends of the arm portions 16 and 17, eye portions 13 and 19 are formed, respectively.

The torsion portion 15 is supported on a part of the vehicle body 13 via a pair of support portions 20 and 21 each including a rubber bushing or the like. The eye portions 18 and 19 are connected to suspension arms of the suspension mechanism portion 12 via link members 22 and 23, respectively. When the vehicle 11 drives on a curve, the arm portions 16 and 17 input loads having opposite phases. At this time, bending forces are exerted on the arm portions 16 and 17, and the torsion portion 15 is twisted. As a result, rolling of the vehicle body 13 is suppressed.

Figure 2:
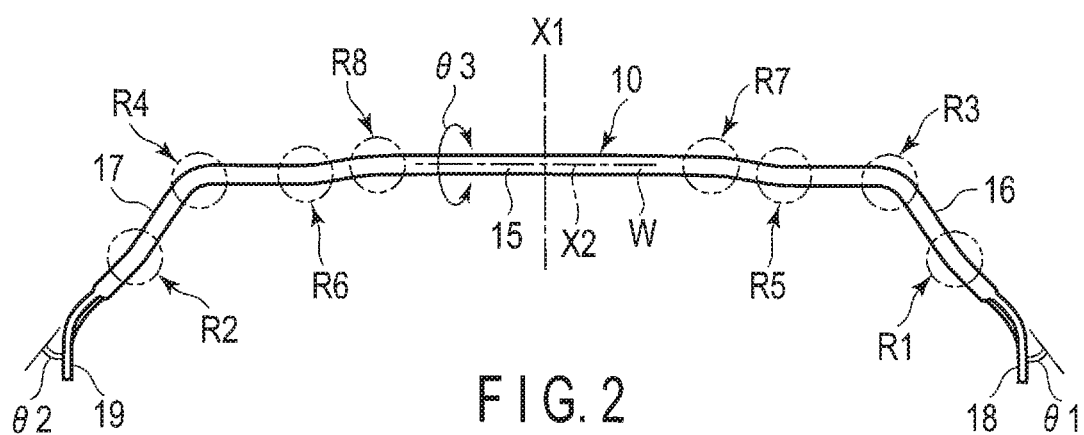
FIG. 2 is a plan view showing an example of the stabilizer.
Figure 3A:
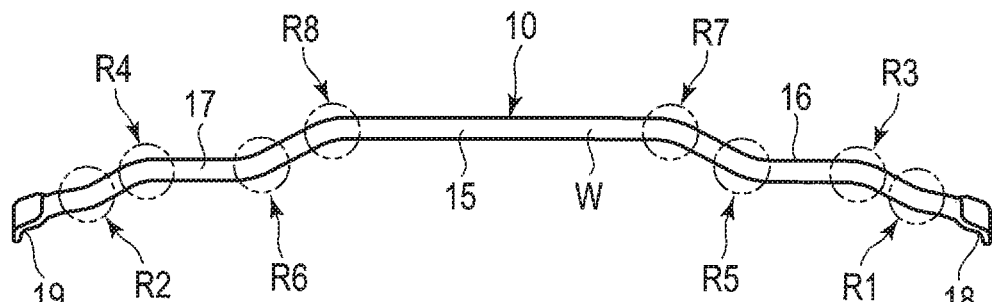
FIG. 3A is a front view of the stabilizer shown in FIG. 2.
Figure 3B:
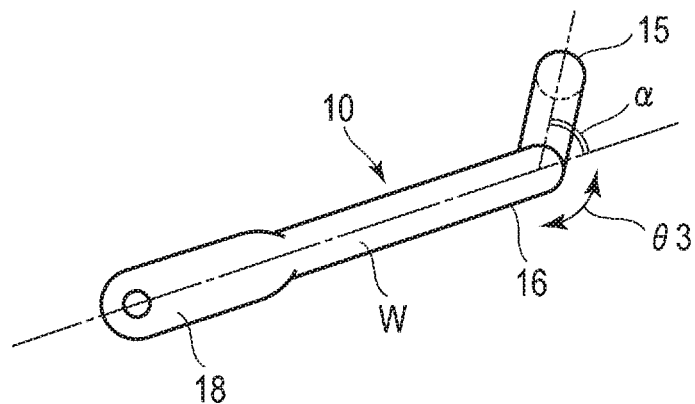
FIG. 3B is a side view of the stabilizer shown in FIG. 2.

FIG. 2 is a plan view showing an example of the stabilizer 10. FIG. 3A is a front view of the stabilizer 10, and FIG. 3B is a side view of the stabilizer 10. The material of the stabilizer 10 (hereinafter referred to as a workpiece W) is formed of steel (for example, low-carbon steel) whose strength can be improved by heat treatment such as quenching. For example, the low-carbon steel is SAE15B26 which is steel conforming to the standards of the Society of Automotive Engineers (SAE) in the United States. The workpiece W may be solid or hollow. The stabilizer 10 may have one or more bent portions including those having a three-dimensionally bent shape in each of the arm portions 16 and 17. Alternatively, the stabilizer 10 may have two or more bent portions in the middle in a longitudinal direction of the torsion portion 15. In the specification, a line segment X2 extending in a longitudinal direction of the stabilizer 10 (workpiece W) in FIG. 2 will be referred to as an axis X2 of the workpiece W.

The shape of the stabilizer 10 is not limited to the example shown in FIG. 2. The stabilizer 10 shown in FIG. 2 is bilaterally symmetrical with respect to its center in the longitudinal direction as a symmetry axis X1. For example, the stabilizer 10 includes a pair of a first bent portion R1 and a second bent portion R2, a pair of a third bent portion R3 and a fourth bent portion R4, a pair of a fifth bent portion R5 and a sixth bent portion R6, and a pair of a seventh bent portion R7 and an eighth bent, portion R8 in order from the vicinities of the eye portions 18 and 19.

Figure 4:
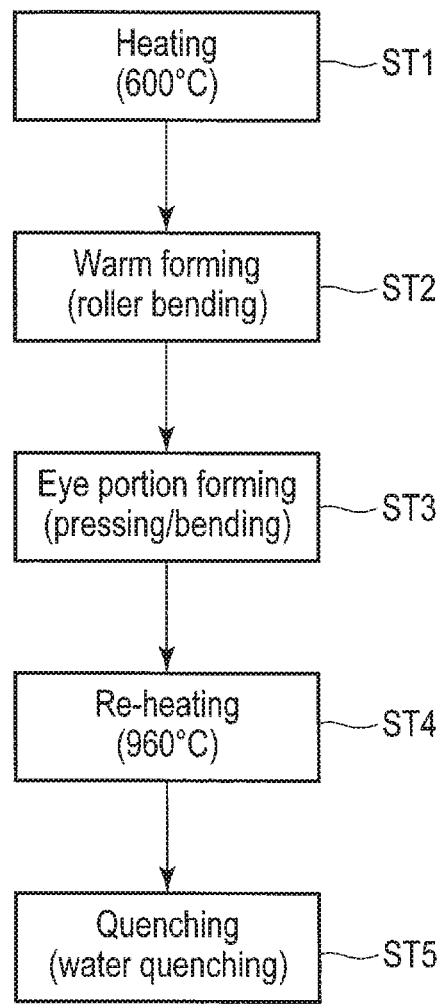
FIG. 4 is an illustration showing an example of a stabilizer manufacturing process.

FIG. 4 shows the manufacturing process of the stabilizer 10 according to the present embodiment.

In a heating process ST1 shown in FIG. 4, the workpiece W as the material of the stabilizer 10 is heated to a temperature suitable for warm forming. The heating temperature is, for example, greater than or equal to 400° C., but its upper limit is set to a temperature not exceeding an A1 point of steel (723° C.). In the case of a solid workpiece, the workpiece is heated to, for example, 600° C. In the case of a hollow workpiece, the workpiece is heated to a warm forming range of less than or equal to 700° C. (a temperature lower than a temperature at which steel is austenitized). Heating in the warm forming range is desirable because it does not substantially cause scales on the surface of the workpiece W, decarburization or the like. For example, a heating means is a heating furnace which heats the workpiece inside the furnace while moving the workpiece by a walking beam. However, electric current heating or high-frequency induction heating may be employed as the heating means.

The workpiece W heated to a temperature suitable for warm forming is formed into a predetermined stabilizer shape in a forming process ST2 shown in FIG. 4. In the forming process ST2, bending (roller bending) of the workpiece W is carried out by a stabilizer manufacturing device 25 (shown in FIGS. 5 to 16) which will be described later in detail. Since the workpiece W treated in the forming process ST2 is heated to the temperature suitable for warm forming (less than the A1 point), as compared with cold forming (at room temperature), the workpiece W has such hardness that plastic working can be easily carried out.

In an eye portion forming process ST3, while the temperature of the workpiece W is maintained in the warm forming range, the eye portions 18 and 19 are bent at predetermined angles (denoted by θ1 and θ2 in FIG. 2) by a pressing/bending die. The shapes or angles θ1 and θ2 of the eye portions 13 and 19 are not limited to the example shown in FIGS. 2, 3A and 3B, and can be realized in various ways as a matter of course.

In a reheating process 5T4 shown in FIG. 4, the workpiece W is heated to a temperature at which quenching can be carried out (for example, 910 to 980° C.±30° C.), that is, a temperature exceeding an A3 transformation point. The heated workpiece W is quenched using a coolant in a quenching process ST5. In the quenching, the workpiece W maintained at a temperature at which quenching can be carried out is immersed in, for example, a water tank and is rapidly cooled. The cooling rate of the workpiece W is assumed to be a temperature gradient at which a hardened structure (martensite) is formed in the workpiece W. Since water quenching is carried out here, quenching is relatively safe as compared with oil quenching. Note that an oil or another fluid may be used as the coolant.

Figure 5:
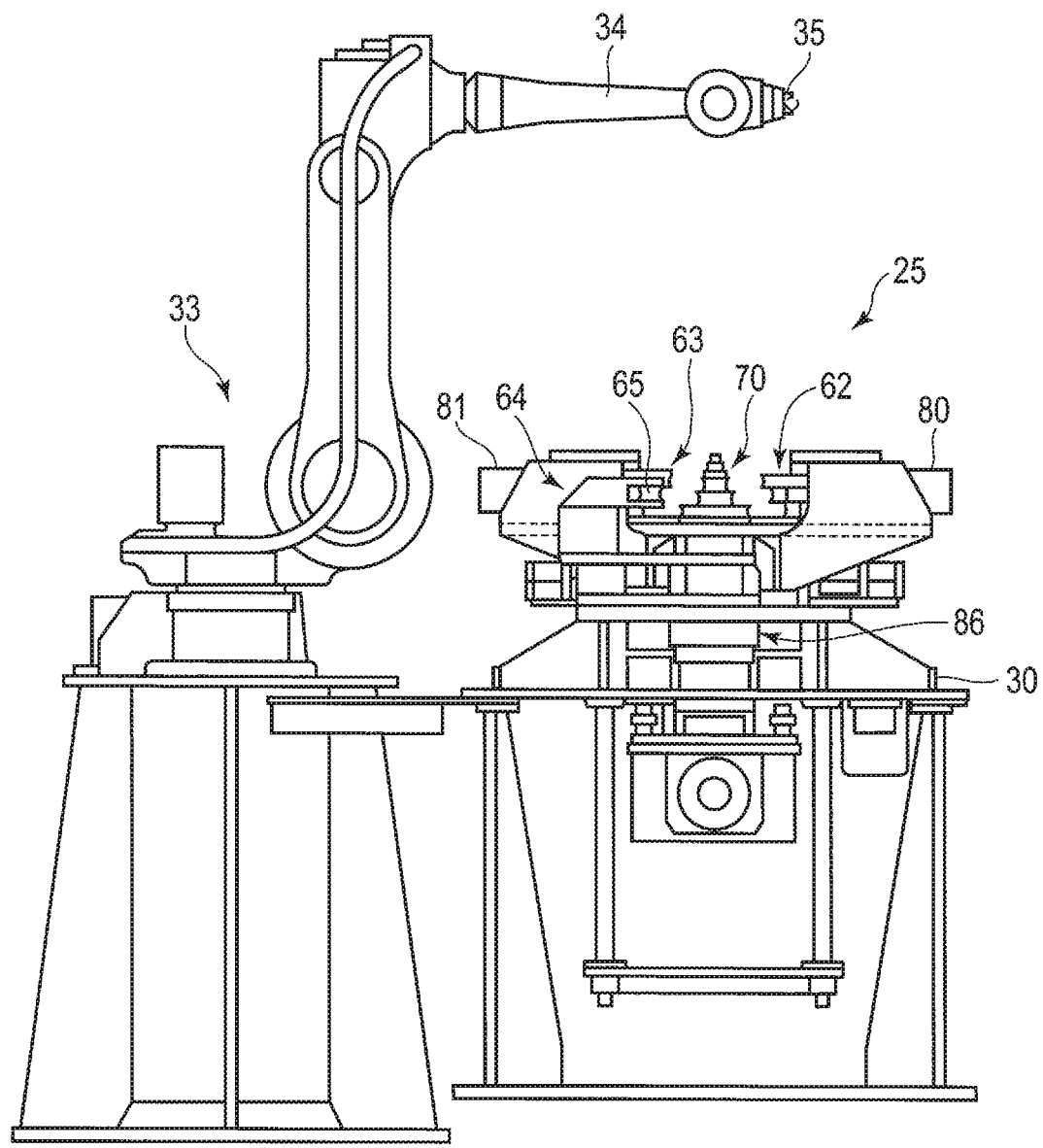
FIG. 5 is a front view of a stabilizer manufacturing device according to one embodiment.
Figure 7:
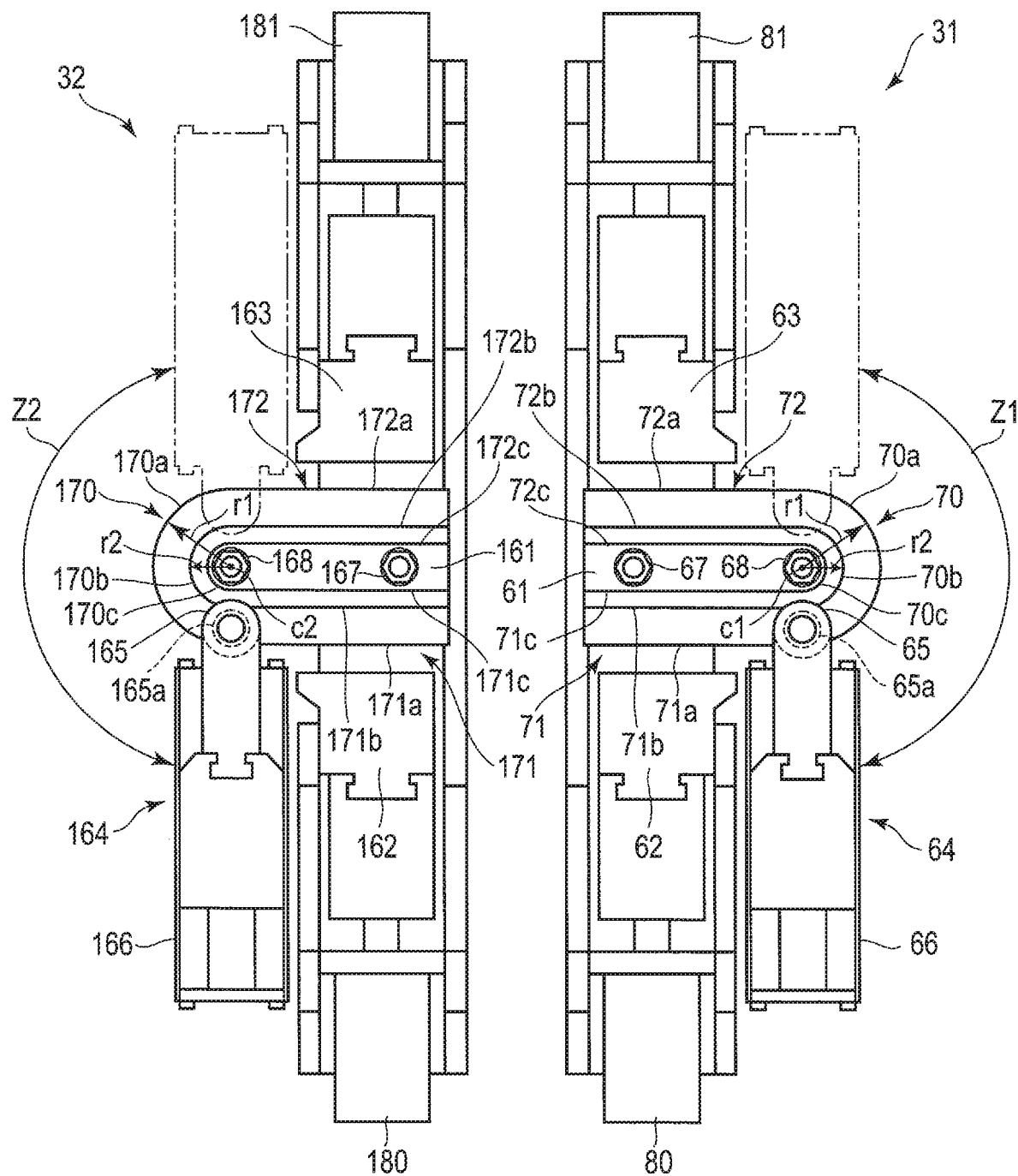
FIG. 7 is an enlarged plan view of a part of the stabilizer manufacturing device.
Figure 8:
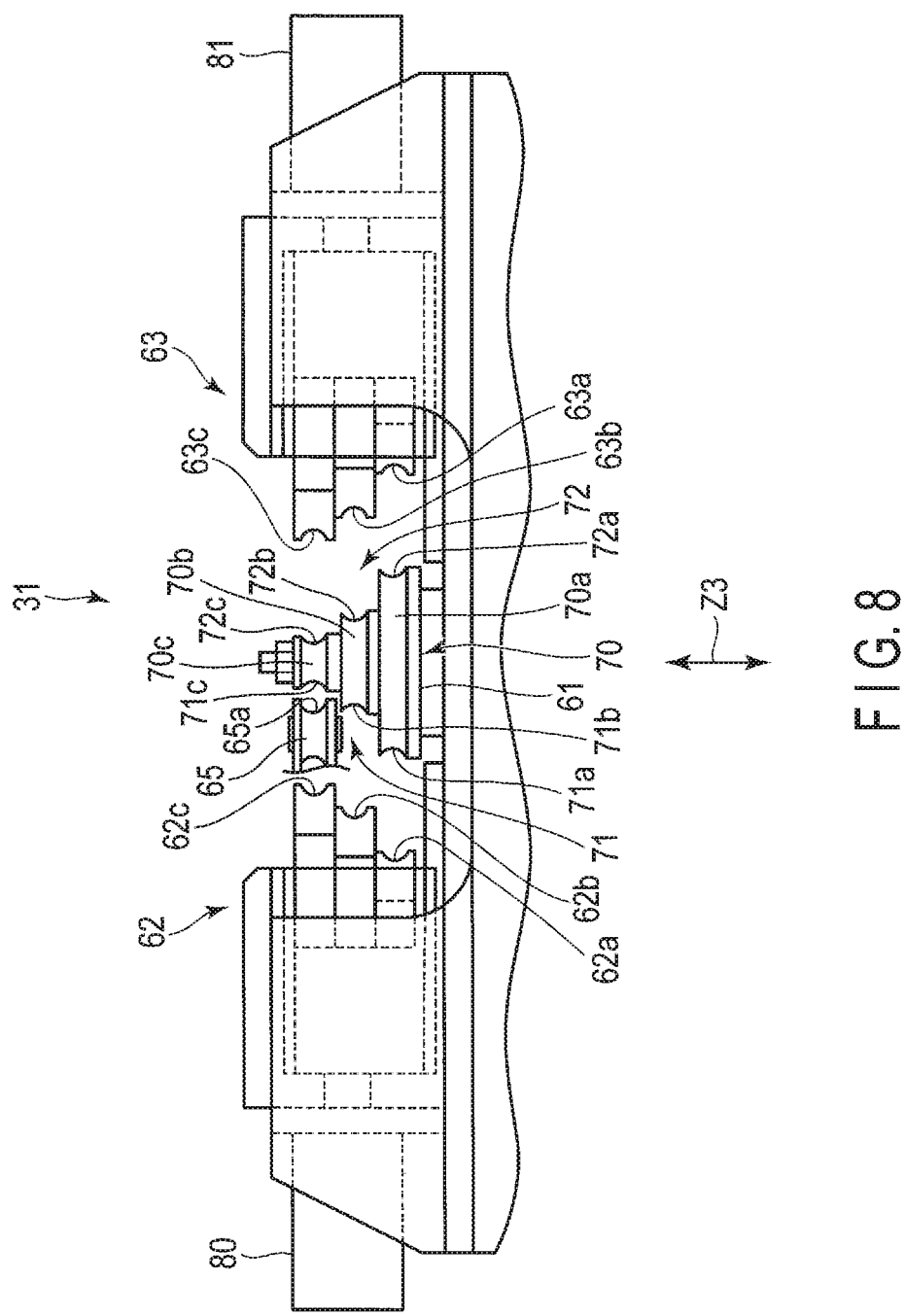
FIG. 8 is an enlarged front view of a part of the stabilizer manufacturing device.

The stabilizer manufacturing device 25 used in the forming process ST2 will be described with reference to FIGS. 5 to 16. FIG. 5 is a front view of the stabilizer manufacturing device 25, and FIG. 6 is a plan view of the stabilizer manufacturing device 25. FIG. 7 is an enlarged plan view of a part of the stabilizer manufacturing device 25, and FIG. 8 is an enlarged front view of a part of the stabilizer manufacturing device 25.

As shown in FIGS. 5 and 6, the stabilizer manufacturing device 25 includes a base 30 installed on the floor of a factory or the like, a first forming unit 31 and a second forming unit 32 mounted on the base 30, a robot 33 provided in the vicinity of the base 30, and the like. The first forming unit 31 and the second forming unit 32 are substantially bilaterally symmetrical. The robot 33 has a robot arm 34. At a distal end of the robot arm 34, a holding portion 35 including a chuck or the like which can hold the workpiece W is provided.

The workpiece W held by the holding portion 35 can be moved to a desired position by the robot arm 34. For example, the stabilizer 10 shown in FIG. 3B has a bent portion which bends at an angle α when viewed from the side. Therefore, according to a direction in which the workpiece W is bent, the workpiece W is rotated about the axis X2. (in a direction denoted by θ3 in FIGS. 2 and 3B) by the robot arm 34. Accordingly, bent portions which are three-dimensionally bent in different directions can be formed in the subsequent bending process.

The base 30 includes guide members 41, 42, 43 and 44 (shown in FIG. 6) extending in a horizontal direction. The first forming unit 31 can move in the horizontal direction along the guide members 41 and 42. The second forming unit 32 can move in the horizontal direction along the guide members 43 and 44. The first forming unit 31 and the second forming unit 32 are arranged so as to move toward each other or move away from each other on the same straight line.

As shown in FIG. 6, the stabilizer manufacturing device 25 includes a first unit drive mechanism 51 for moving the first forming unit 31, and a second unit drive mechanism 52 for moving the second forming unit 32. The distance between the first forming unit 31 and the second forming unit 32 can be changed by the first unit drive mechanism 51 and the second unit drive mechanism 52. For example, the unit drive mechanisms 51 and 52 can move the forming units 31 and 32 to predetermined positions by servomotors and ball screws, respectively.

First, the first forming unit 31 shown on the right side of FIG. 7 will be described.

The first forming unit 31 includes a first movable frame 60 which moves along the guide members 41 and 42 (shown in FIG. 6), a first forming mandrel 61, a first front holding member 62, a first rear holding member 63, and a first bending roller mechanism 64. The first bending roller mechanism 64 includes a rotatable first bending roller 65, an actuator 66 which moves the first bending roller 65 toward the forming mandrel 61, and the like. On a circumferential surface of the first bending roller 65, a groove 65a according to the diameter of the workpiece W is formed.

The first forming mandrel 61 is fixed to the first movable frame 60 by bolts 67 and 68. As shown in FIG. 7, the first forming mandrel 61 includes a first forming portion 70 having an arc shape (substantially semicircular shape) when viewed from above, a front support portion 71, and a rear support portion 72. The front support portion 71 and the rear support portion 72 are substantially straight and are parallel to each other. As will be described later in detail, the front support portion 71 supports a surface W1 of the workpiece W between the front support portion 71 and the first front holding member 62 when the workpiece W is bent in a first direction (indicated by an arrow F1 in FIG. 10). The first rear support portion 72 supports a surface W2 of the workpiece W between the rear support portion 72 and the first rear holding member 63 when the workpiece W is bent in a second direction (indicated by an arrow F2 in FIG. 12).

The first bending roller 65 can be moved in a direction toward and a direction away from the forming portion 70 of the first forming mandrel 61 by the actuator 66. The first bending roller 65 revolves along the arc-shaped first forming portion 70 as indicated by a two-headed arrow Z1 in FIG. 7. That is, the first bending roller 65 is revolved substantially 180° about a center C1 of the first forming portion 70 by a first revolving mechanism 75 (partly shown in FIG. 5). The height of the first bending roller 65 is constant.

As shown in FIG. 7, the arc-shaped first forming portion 70 has a large-diameter arc-shaped surface 70a having a first radius of curvature r1, a small-diameter arc-shaped surface 70b having a second radius of curvature r2 which is less than the first radius of curvature r1, and a smallest arc-shaped surface 70c having a radius of curvature which is less than the second radius of curvature r2. When a bent portion having a large radius of curvature (for example, the bent portion R5) is bent, the large-diameter arc-shaped surface 70a is used. When a bent portion having a small radius of curvature (for example, the bent portions R1, R3 and R7) is bent, the small-diameter arc-shaped surface 70b is used. When a bent portion having an even smaller radius of curvature is bent, the smallest arc-shaped surface 70c is used.

The forming portion 70 of the present embodiment has three arc-shaped surfaces 70a, 70b and 70c having different radii of curvature. However, the forming portion 70 only needs to have at least two arc-shaped surfaces having different radii of curvature. Depending on circumstances, the forming portion 70 may have four or more arc-shaped surfaces having different radii of curvature.

As shown in FIGS. 7 and 8, the front support portion 71 of the first forming mandrel 61 includes a lower support surface 71a, a middle support surface 71b, and an upper support surface 71c. The lower support surface 71a is continuous with the large-diameter arc-shaped surface 70a and extends in the horizontal direction. The middle support surface 71b is continuous with the small-diameter arc-shaped surface 70b and extends in the horizontal direction. The upper support surface 71c is continuous with the smallest arc-shaped surface 70c and extends in the horizontal direction. On each of the support surfaces 71a, 71b and 71c, a groove corresponding to the diameter of the workpiece W is formed.

As shown in FIG. 8, the first front holding member 62 includes a lower holding surface 62a, a middle holding surface 62b, and an upper holding surface 62c. The lower holding surface 62a is opposed to the lower support surface 71a and extends in the horizontal direction. The middle holding surface 62b is opposed to the middle support surface 71b and extends in the horizontal direction. The upper holding surface 62c is opposed to the upper support surface 71c and extends in the horizontal direction.

The lower holding surface 62a is located at the same height as the large-diameter arc-shaped surface 70a. The middle holding surface 62b is located at the same height as the small-diameter arc-shaped surface 70b. The upper holding surface 62c is located at the same height as the smallest arc-shaped surface 70c. On each of the holding surfaces 62a, 62b and 62c, a groove corresponding to the diameter of the workpiece W is formed. The distance from the lower support surface 71a to the lower holding surface 62a, the distance from the middle support surface 71b to the middle holding surface 62b, and the distance from the upper support surface 71c to the upper holding surface 62c are equal to one another.

As shown in FIGS. 7 and 8, the rear support portion 72 of the first forming mandrel 61 includes a lower support surface 72a, a middle support surface 72b and an upper support surface 72c. The lower support surface 72a is continuous with the large-diameter arc-shaped surface 70a and extends in the horizontal direction. The middle support surface 72b is continuous with the small-diameter arc-shaped surface 70b and extends in the horizontal direction. The upper support surface 72c is continuous with the smallest arc-shaped surface 70c and extends in the horizontal direction. On each of the support surfaces 72a, 72b and 72c, a groove corresponding to the diameter of the workpiece W is formed.

As shown in FIG. 8, the first rear holding member 63 includes a lower holding surface 63a, a middle holding surface 63b and an upper holding surface 63c. The lower holding surface 63a is opposed to the lower support surface 72a and extends in the horizontal direction. The middle holding surface 63b is opposed to the middle support surface 72b and extends in the horizontal direction. The upper holding surface 63c is opposed to the upper support surface 72c and extends in the horizontal direction.

The lower holding surface 63a is located at the same height as the large-diameter arc-shaped surface 70a. The middle holding surface 63b is located at the same height as the small-diameter arc-shaped surface 70b. The upper holding surface 63c is located at the same height as the smallest arc-shaped surface 70c. On each of the holding surfaces 63a, 63b and 63c, a groove corresponding to the diameter of the workpiece W is formed. The distance from the lower support surface 72a to the lower holding surface 63a, the distance from the middle support surface 72b to the middle holding surface 63b, and the distance from the upper support surface 72c to the upper holding surface 63c are equal to one another.

The first forming unit 31 includes a first front actuator 80 for driving the first front holding member 62, and a first rear actuator 81 for driving the first rear holding member 63. The first front holding member 62 and the first rear holding member 63 can be synchronized with each other and simultaneously moved toward the first forming mandrel 61 by the actuators 80 and 81.

The workpiece W can be clamped between the front support portion 71 of the first forming mandrel 61 and the first front holding member 62. The workpiece W can be clamped between the rear support portion 72 of the first forming mandrel 61 and the first rear holding member 63. The actuators 80 and 81 are, for example, hydraulic cylinders, but other drive sources (for example, electric actuators such as servomotors) may be used.

The first forming mandrel 61, the first front holding member 62 and the first rear holding member 63 can be moved in a vertical direction (indicated by a two-headed arrow Z3 in FIG. 8) by a first lifting/lowering mechanism 86 (shown in FIG. 5). The drive source of the first lifting/lowering mechanism 86 is, for example, an electric actuator such as a servomotor, but another drive source (for example, a hydraulic cylinder) may be used.

By moving the first forming mandrel 61 in the vertical direction by the first lifting/lowering mechanism 86, it is possible to move the large-diameter arc-shaped surface 70a, the small-diameter arc-shaped surface 70b or the smallest arc-shaped surface 70c to the same height as the first bending roller 65. FIG. 8 shows a state where the smallest arc-shaped surface 70c is moved to the same height as the first bending roller 65.

Next, the second forming unit 32 shown on the left side of FIG. 7 will be described.

The second forming unit 32 includes a second movable frame 160 which moves along the guide members 43 and 44 (shown in FIG. 6), a second forming mandrel 161, a second front holding member 162, a second rear holding member 163, and a second bending roller mechanism 164. The second bending roller mechanism 164 includes a rotatable second bending roller 165, an actuator 166 which moves the second bending roller 165 toward the forming mandrel 161, and the like. On a circumferential surface of the second bending roller 165, a groove 165a according to the diameter of the workpiece W is formed.

The second forming mandrel 161 is fixed to the second movable frame 160 by bolts 167 and 168. As shown in FIG. 7, the second forming mandrel 161 includes a second forming portion 170 having an arc shape (substantially semicircular shape) when viewed from above, a front support portion 171, and a rear support portion 172. The front support portion 171 and the rear support portion 172 are substantially straight and are parallel to each other. As will be described later in detail, the front support portion 171 supports the surface W1 of the workpiece W between the front support portion 171 and the second front holding member 162 when the workpiece W is bent in the first direction (indicated by the arrow F1 in FIG. 10). The rear support portion 172 supports the surface W2 of the workpiece W between the rear support portion 172 and the second rear holding member 163 when the workpiece W is bent in the second direction (indicated by the arrow F2 in FIG. 12).

The second bending roller 165 can be moved in a direction toward and a direction away from the forming portion 170 of the second forming mandrel 161 by the actuator 166. The second bending roller 165 revolves along the arc-shaped second forming portion 170 as indicated by a two-headed arrow 22 in FIG. 7. That is, the second bending roller 165 is revolved substantially 180° about a center C2 of the second forming portion 170 by a second revolving mechanism 175 (partly shown in FIG. 6). The height of the second bending roller 165 is constant.

As shown in FIG. 7, the arc-shaped second forming portion 170 has a large-diameter arc-shaped surface 170a having the first radius of curvature r1, a small-diameter arc-shaped surface 170b having the second radius of curvature r2 which is less than the first radius of curvature r1, and a smallest arc-shaped surface 170c having a radius of curvature which is less than the second radius of curvature r2. When a bent portion having a large radius of curvature (for example, the bent portion R6) is bent, the large-diameter arc-shaped surface 170a is used. When a bent portion having a small radius of curvature (for example, the bent portions R2, R4 and R8) is bent, the small-diameter arc-shaped surface 170b is used. When a bent portion having an even smaller radius of curvature is bent, the smallest arc-shaped surface 170c is used.

The forming portion 170 of the present embodiment has three arc-shaped surfaces 170a, 170b and 170c having different radii of curvature. However, the forming portion 170 only needs to have at least two arc-shaped surfaces having different radii of curvature. Depending on circumstances, the forming portion 170 may have four or more arc-shaped surfaces having different radii of curvature.

As shown in FIG. 7, the front support portion 171 of the second forming mandrel 161 includes a lower support surface 171a, a middle support surface 171b and an upper support surface 171c. The lower support surface 171a is continuous with the large-diameter arc-shaped surface 170a and extends in the horizontal direction. The middle support surface 171b is continuous with the small-diameter arc-shaped surface 170b and extends in the horizontal direction. The upper support surface 171c is continuous with the smallest arc-shaped surface 170c and extends in the horizontal direction. On each of the support surfaces 171a, 171b and 171c, a groove corresponding to the diameter of the workpiece W is formed. Note that, since the second front holding member 162 has the same structure as the first front holding member 62, explanation will be omitted.

As shown in FIG. 7, the rear support portion 172 of the second forming mandrel 161 includes a lower support surface 172a, a middle support surface 172b and an upper support surface 172c. The lower support surface 172a is continuous with the large-diameter arc-shaped surface 170a and extends in the horizontal direction. The middle support surface 172b is continuous with the small-diameter arc-shaped surface 170b and extends in the horizontal direction. The upper support surface 172c is continuous with the smallest arc-shaped surface 170c and extends in the horizontal direction. On each of the support surfaces 172a, 172b and 172c, a groove corresponding to the diameter of the workpiece W is formed. Note that, since the second rear holding member 163 has the same structure as the first rear holding member 63, explanation will be omitted.

The second forming unit 32 includes a second front actuator 180 for driving the second front holding member 162, and a second rear actuator 181 for driving the second rear holding member 163. The second front holding member 162 and the second rear holding member 163 can be synchronized with each other and simultaneously moved toward the second forming mandrel 161 by the actuators 180 and 181.

The workpiece W can be clamped between the front support portion 171 of the second forming mandrel 161 and the second front holding member 162. The workpiece W can be clamped between the rear support portion 172 of the second forming mandrel 161 and the second rear holding member 163. The actuators 180 and 181 are, for example, hydraulic cylinders, but other drive sources (for example, electric actuators such as servomotors) may be used.

The second forming mandrel 161, the second front holding member 162 and the second rear holding member 163 can be moved in the vertical direction by a second lifting/lowering mechanism. The second lifting/lowering mechanism has the same structure as the first lifting/lowering mechanism 86. By moving the second forming mandrel 161 in the vertical direction by the second lifting/lowering mechanism, it is possible to move the large-diameter arc-shaped surface 170a, the small-diameter arc-shaped surface 170b or the smallest arc-shaped surface 170c to the same height as the second bending roller 165.

The workpiece W is oriented in a predetermined direction and located at a predetermined position (positioned) in the previous process (positioning process). When the workpiece W is bent in the first, direction (indicated by the arrow F1 in FIG. 10), the robot arm 34 sets the workpiece W positioned in the positioning process directly on a front side of the forming mandrels 61 and 161. When the workpiece W is bent in the second direction (indicated by the arrow F2 in FIG. 12), the robot arm 34 sets the workpiece W on a rear side of the forming mandrels 61 and 161.

A process of bending the bent portions R1 to R8 of the workpiece W by the stabilizer manufacturing device 25 will be described with reference to FIGS. 9 to 16.

Figure 9:
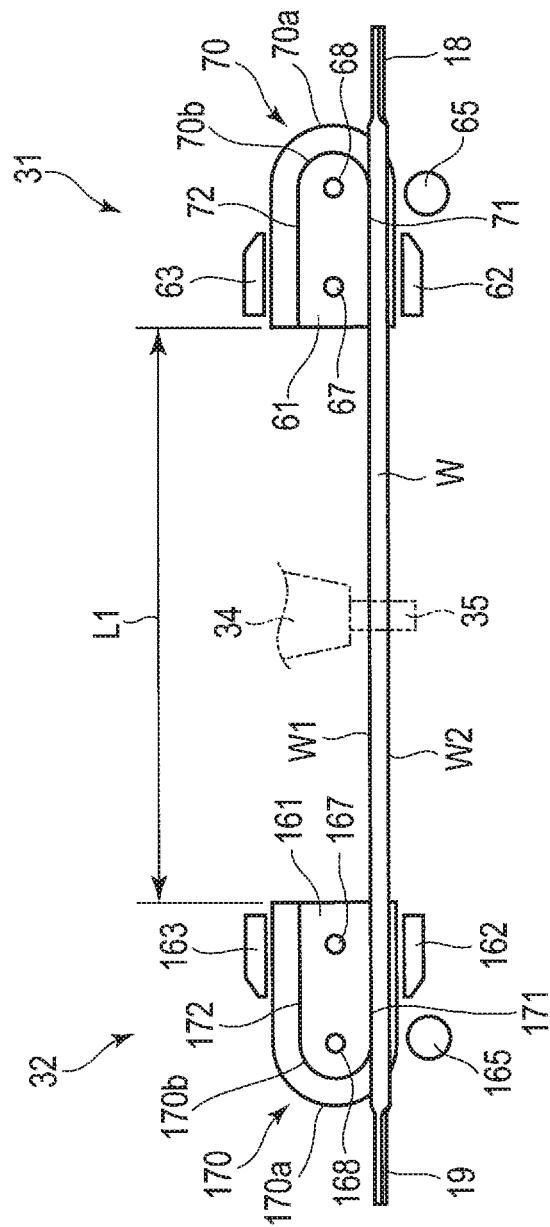
FIG. 9 is a plan view schematically showing a part of the stabilizer manufacturing device and a workpiece.
Figure 10:
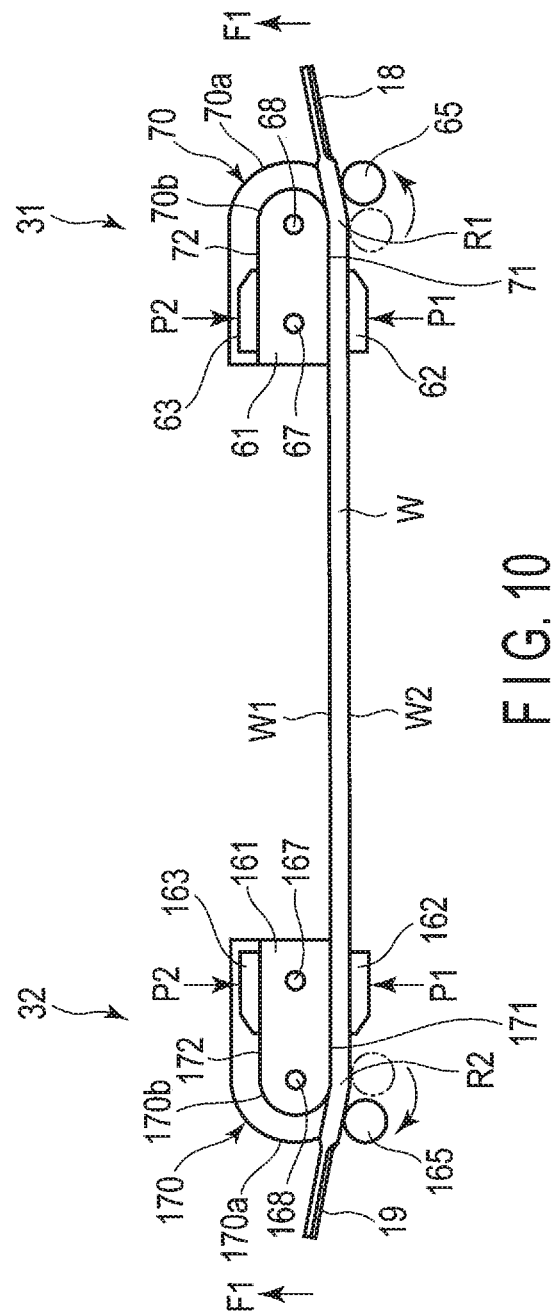
FIG. 10 is a plan view schematically showing a part of the stabilizer manufacturing device and the workpiece in which a first bent portion and a second bent portion are formed.

FIGS. 9 and 10 show a case where the first bent portion R1 and the second bent portion R2 are bent. The first forming mandrel 61 is moved to a position corresponding to the first bent portion R1. The second forming mandrel 161 is moved to a position corresponding to the second bent portion R2. The first forming mandrel 61 and the second forming mandrel 161 are apart from each other by a distance L1. The workpiece W is substantially straight. In this case, the small-diameter arc-shaped surfaces 70b and 170b are selected in the bending process, and the small-diameter arc-shaped surfaces 70b and 170b are used.

As shown in FIG. 9, the first front holding member 62 is apart from the front support portion 71 of the first forming mandrel 61. The first rear holding member 63 is apart from the rear support portion 72 of the first forming mandrel 61. The first forming mandrel 61 is moved to such a position that the small-diameter arc-shaped surface 70b is located at the same height as the first bending roller 65.

The second front holding member 162 is apart from the front support portion 171 of the second forming mandrel 161. The second rear holding member 163 is apart from the rear support portion 172 of the second forming mandrel 161. The second forming mandrel 161 is moved to such a position that the small-diameter arc-shaped surface 170b is located at the same height as the second bending roller 165. The first bending roller 65 and the second bending roller 165 are retreated to such positions that the first bending roller 65 and the second bending roller 165 do not interfere with the workpiece W. In this state, the workpiece W is arranged on the front side of the forming mandrels 61 and 161 by the robot arm 34.

As shown in FIG. 10, the first front holding member 62 is moved in a direction indicated by an arrow P1, and the workpiece W is clamped by the first front holding member 62 and the first forming mandrel 61. Simultaneously, the first rear holding member 63 is moved in a direction indicated by an arrow P2. The first rear holding member 63 is brought into contact with the first forming mandrel 61, and the first forming mandrel 61 is supported from the rear side.

In addition, the second front holding member 162 is moved in the direction indicated by the arrow P1, and the workpiece W is clamped by the second front holding member 162 and the second forming mandrel 161. Simultaneously, the second rear holding member 163 is moved in the direction indicated by the arrow P2. The second rear holding member 163 is brought into contact with the second forming mandrel 161, and the second forming mandrel 161 is supported from the rear side.

Accordingly, a load is applied from both the front side and the rear side of the first forming mandrel 61, a high clamp load is prevented from being applied from one side of the first forming mandrel 61. Therefore, an excessive load is not applied to the first forming mandrel 61 and the bolts 67 and 68, and the position of the first forming mandrel 61 is prevented from being shifted. Similarly, a load is applied from both the front side and the rear side of the second forming mandrel 161, a high clamp load is prevented from being applied from one side of the second forming mandrel 161. Therefore, an excessive load is not applied to of the second forming mandrel 161 and the bolts 167 and 168, and the position of the second forming mandrel 161 is prevented from being shifted.

As shown in FIG. 10, the first bending roller 65 is moved along the small-diameter arc-shaped surface 70b of the first forming mandrel 61, an eye portion 18 side of the workpiece W is bent in the first direction F1, and the first bent portion R1 is formed. Simultaneously, the second bending roller 165 is moved along the small-diameter arc-shaped surface 170b of the second forming mandrel 161, an eye portion 19 side of the workpiece W is bent in the first direction F1, and the second bent portion R2 is formed.

Figure 11:
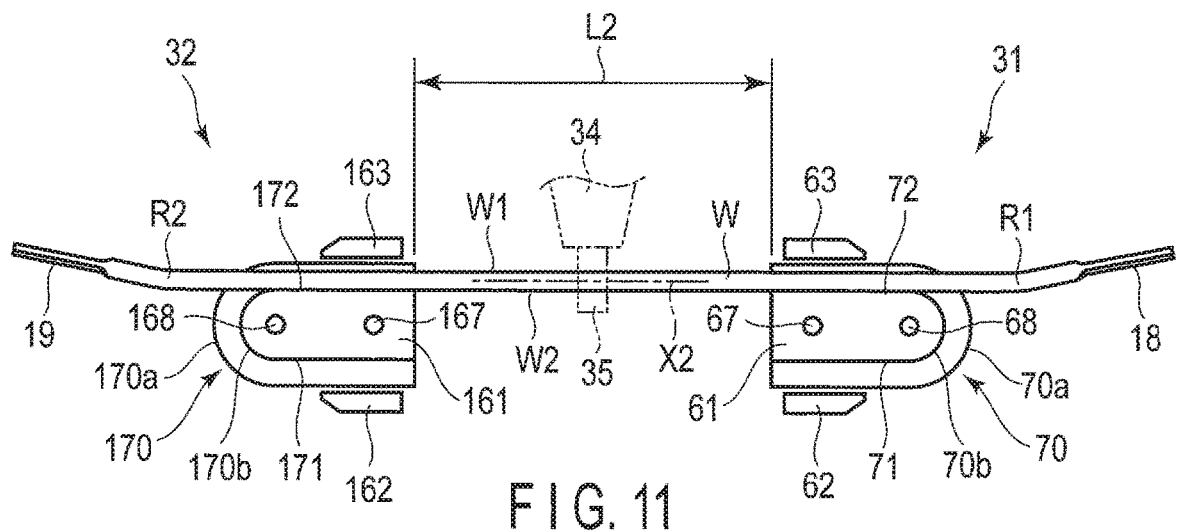
FIG. 11 is a plan view schematically showing a part of the stabilizer manufacturing device and the moved workpiece.
Figure 12:
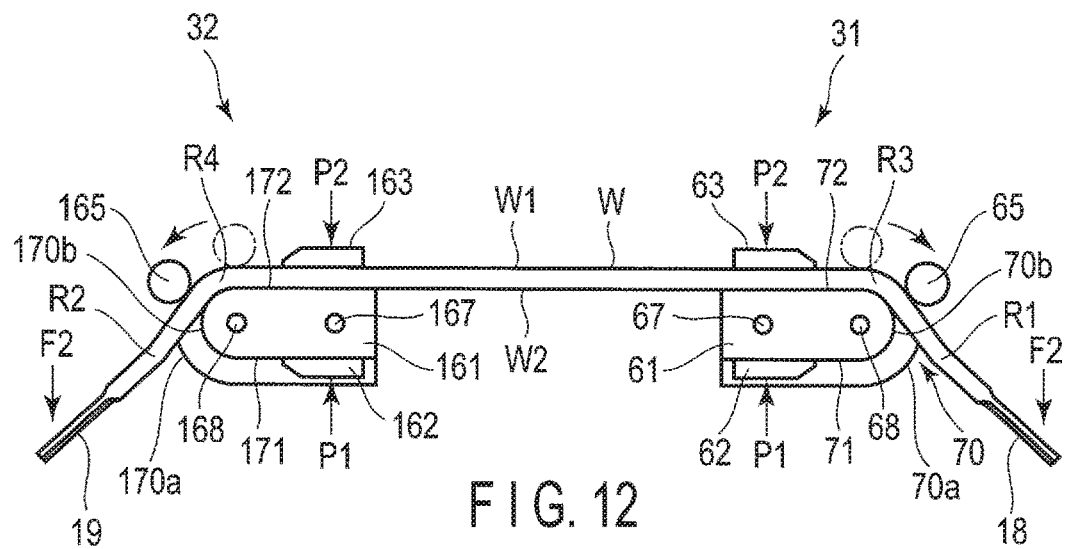
FIG. 12 is a plan view schematically showing a part of the stabilizer manufacturing device and the workpiece in which a third bent portion and a fourth bent portion are formed.

FIGS. 11 and 12 show a case where the third bent portion R3 and the fourth bent portion R4 are bent. The first forming mandrel 61 is moved to a position corresponding to the third bent portion R3. The second forming mandrel 161 is moved to a position corresponding to the fourth bent portion R4. The distance between the first forming mandrel 61 and the second forming mandrel 161 is changed to L2.

As shown in FIG. 11, the first rear holding member 63 is apart from the first forming mandrel 61. The second rear holding member 163 is apart from the second forming mandrel 161. In this state, the workpiece W is set on a rear side of the forming mandrels 61 and 161 by the robot arm 34. At this time, the robot arm 34 rotates the workpiece W about the axis X2 and positions the workpiece W according to a direction in which the bent portions R3 and R4 are bent (for example, the angle α shown in FIG. 3B). Accordingly, the bent portions R3 and R4 can be bent in a direction (three-dimensional direction) different from that of the bent portions R1 and R2. Similarly, the other bent portions R5 to R8 can be bent in desired directions by being rotated about the axis X2 of the workpiece W by the robot arm 34.

As shown in FIG. 12, the first front holding member 62 is moved in the direction indicated by the arrow P1, and the first forming mandrel 61 is supported from the front side. Simultaneously, the first rear holding member 63 is moved in the direction indicated by the arrow P2, and the workpiece W is clamped by the first rear holding member 63 and the first forming mandrel 61.

In addition, the second front holding member 162 is moved in the direction indicated by the arrow P1, and the second forming mandrel 161 is supported from the front side. Simultaneously, the second rear holding member 163 is moved in the direction indicated by the arrow P2, the workpiece W is clamped by the second rear holding member 163 and the second forming mandrel 161.

As shown in FIG. 12, the first bending roller 65 is moved along the small-diameter arc-shaped surface 70b of the first forming mandrel 61, the eye portion 18 side of the workpiece W is bent in the second direction F2, and the third bent portion R3 is formed. Simultaneously, the second bending roller 165 is moved along the small-diameter arc-shaped surface 170b of the second forming mandrel 161, the eye portion 19 side of the workpiece W is bent in the second direction F2, and the fourth bent portion R4 is formed.

The fifth bent portion R5 and the sixth bent portion R6 are located close to each other. The seventh bent portion R7 and the eighth bent portion R8 are located close to each other. Therefore, if the fifth bent portion R5 and the sixth bent portion R6 are simultaneously bent, the first forming unit 31 and the second forming unit 32 may interfere with each other. Similarly, if the seventh bent portion R7 and the eighth bent portion R8 are simultaneously bent, the first forming unit 31 and the second forming unit 32 may interfere with each other. Therefore, in the present embodiment, when the closely-located bent portions R5, R6, R7 and R8 are bent, their bending processes are separated from one another.

Figure 13:
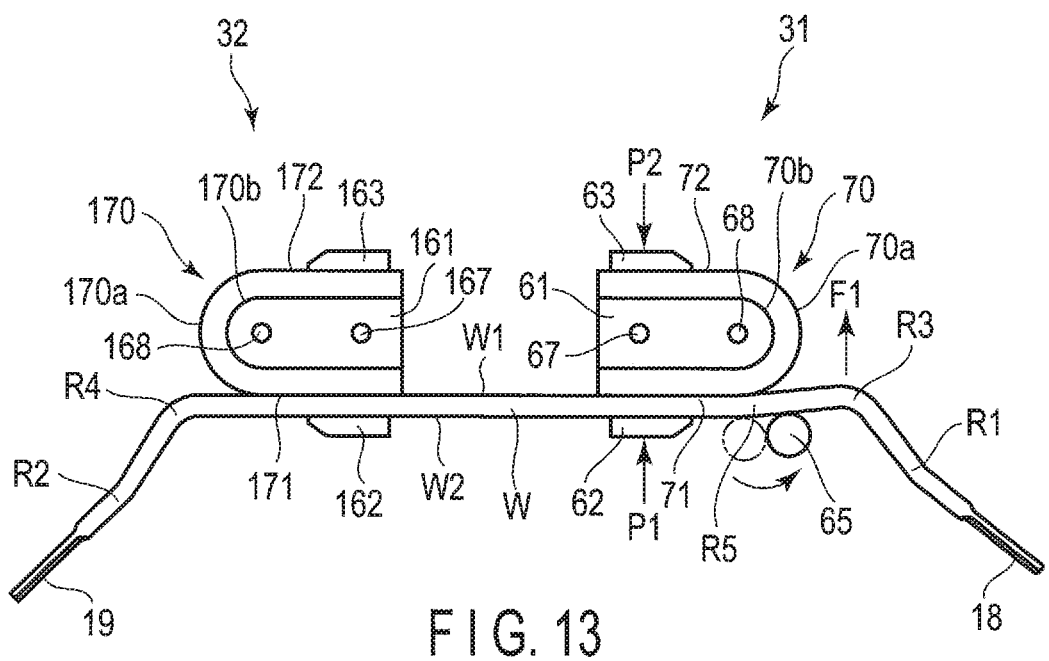
FIG. 13 is a plan view schematically showing a part of the stabilizer manufacturing device and the workpiece in which a fifth bent portion is formed.

FIG. 13 shows a case where the fifth bent portion R5 is bent. The first forming mandrel 61 is moved to a position corresponding to the fifth bent portion R5. In this case, the large-diameter arc-shaped surface 70a is selected in the bending process, and the large-diameter arc-shaped surface 70a is used. Therefore, the large-diameter arc-shaped surface 70a of the first forming mandrel 61 is opposed to the first bending roller 65. The workpiece W is clamped by the first front holding member 62 and the first forming mandrel 61. Simultaneously, the first rear holding member 63 is brought into contact with the first forming mandrel 61, and the first mandrel 61 is supported from the rear side. In this state, the first bending roller 65 is moved along the large-diameter arc-shaped surface 70a of the first forming mandrel 61, the eye portion 18 side of the workpiece W is bent in the first direction F1, and the fifth bent portion R5 is formed.

Figure 14:
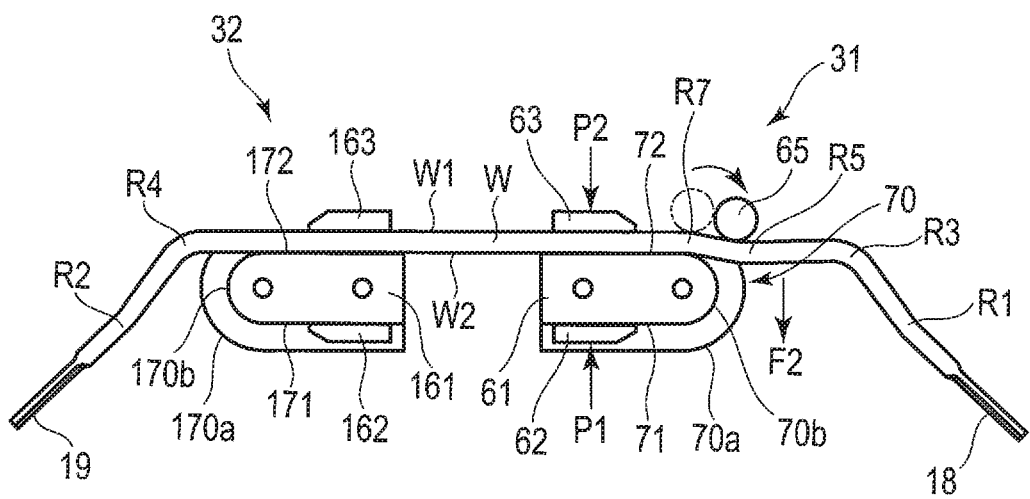
FIG. 14 is a plan view schematically showing a part of the stabilizer manufacturing device and the workpiece in which a seventh bent portion is formed.

FIG. 14 shows a case where the seventh bent portion R7 is bent. The workpiece W is moved to the rear side of the first forming mandrel 61 by the robot arm 34. The first forming mandrel 61 is moved to a position corresponding to the seventh bent portion R7. In this case, the small-diameter arc-shaped surface 70b is selected in the bending process, and the small-diameter arc-shaped surface 70b is used. Therefore, the small-diameter arc-shaped surface 70b of the first forming mandrel 61 is opposed to the first bending roller 65.

As shown in FIG. 14, the workpiece W is clamped by the first rear holding member 63 and the first forming mandrel 61. Simultaneously, the first front holding member 62 is brought into contact with the first forming mandrel 61, and the first forming mandrel 61 is supported from the front side. In this state, the first bending roller 65 is moved along the small-diameter arc-shaped surface 70b of the first forming mandrel 61, the eye portion 18 side of the workpiece W is bent in the second direction F2, and the seventh bent portion R7 is formed.

Figure 15:
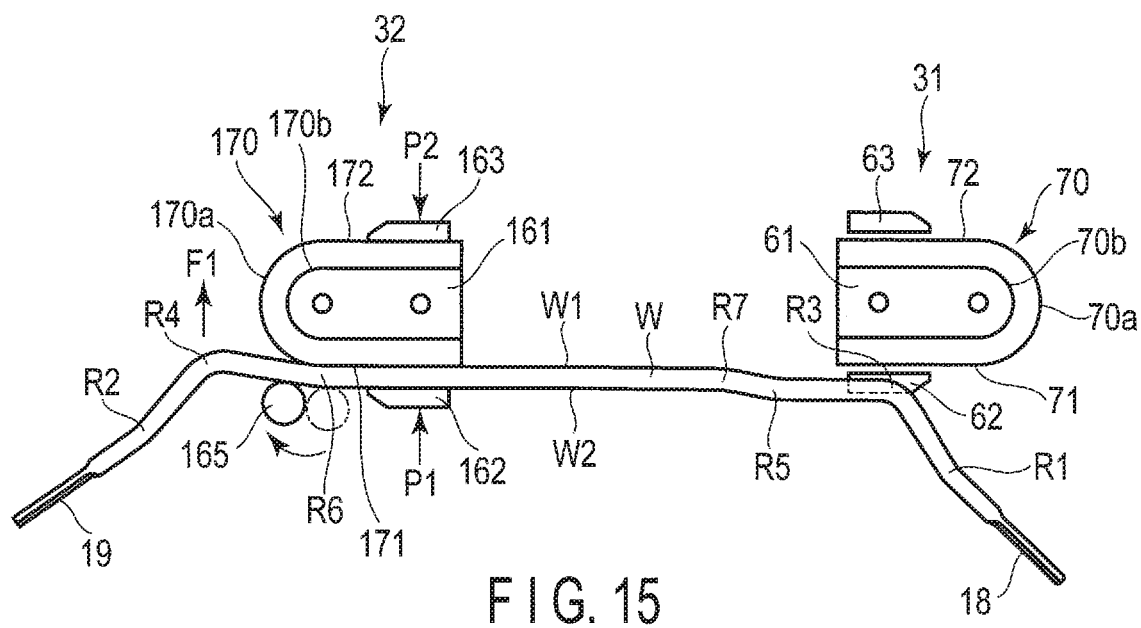
FIG. 15 is a plan view schematically showing a part of the stabilizer manufacturing device and the workpiece in which a sixth bent portion is formed.

FIG. 15 shows a case where the sixth bent portion R6 is bent. The workpiece W is moved to the front side of the second forming mandrel 161 by the robot arm. The second forming mandrel 161 is moved to a position corresponding to the sixth bent portion R6. In this case, the large-diameter arc-shaped surface 170a is selected in the bending process, and the large-diameter arc-shaped surface 170a is used. Therefore, the large-diameter arc-shaped surface 170a of the second forming mandrel 161 is opposed to the second bending roller 165. The workpiece W is clamped by the second front holding member 162 and the second forming mandrel 161. Simultaneously, the second rear holding member 163 is brought into contact with the second forming mandrel 161, and the second mandrel 161 is supported from the rear side. In this state, the second bending roller 165 is moved along the large-diameter arc-shaped surface 170a of the second forming mandrel 161, the eye portion 19 side of the workpiece W is bent in the first direction F1, and the sixth bent portion R6 is formed.

Figure 16:
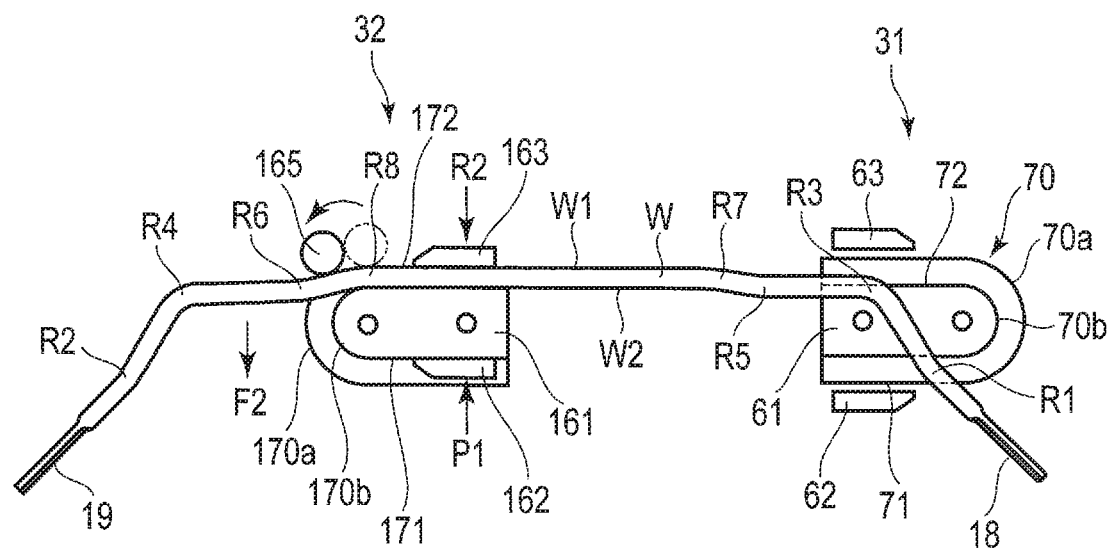
FIG. 16 is a plan view schematically showing a part of the stabilizer manufacturing device and the workpiece in which an eighth bent portion is formed.

FIG. 16 shows a case where the eighth bent portion R8 is bent. The workpiece W is moved to the rear side of the second forming mandrel 161 by the robot arm. The second forming mandrel 161 is moved to a position corresponding to the eighth bent portion R8. In this case, the small-diameter arc-shaped surface 170b is selected in the bending process, and the small-diameter arc-shaped surface 170b is used. Therefore, the small-diameter arc-shaped surface 170b of the second forming mandrel 161 is opposed to the second bending roller 165.

The workpiece W is clamped by the second rear holding member 163 and the second forming mandrel 161. Simultaneously, the second front holding member 162 is brought into contact with the second forming mandrel 161, and the second forming mandrel 161 is supported from the front side. In this state, the second bending roller 165 is moved along the small-diameter arc-shaped surface 170b of the second forming mandrel 161, the eye portion 19 side of the workpiece W is bent in the second direction F2, and the eighth bent portion R8 is formed.

As described above, the stabilizer manufacturing method of the present embodiment includes the following processes.
(1) In the heating process ST1 shown in FIG. 4, the steel workpiece W as the material of the stabilizer is heated to a temperature in the warm working range.
(2) In the forming process (roller bending) ST2 shown in FIG. 4, bending (roller bending) of the heated workpiece W is carried out at a temperature suitable for warm forming. The bending (roller bending) is carried out, for example, through the processes shown in FIGS. 10 to 16 by the stabilizer manufacturing device 25.
(3) For example, as shown in FIG. 9, the heated workpiece W is arranged on one side (front side) of the forming mandrels 61 and 161.
(4) As shown in FIG. 10, the workpiece W is fixed to the support portions 71 and 171 of the forming mandrels 61 and 161 by the one holding members 62 and 162. Simultaneously, the forming mandrels 61 and 161 are supported by the other holding members 63 and 163.

(5) As shown in FIG. 10, the bending roller 65 and 165 are moved along the arc-shaped forming portions 70 and 170, respectively, and the workpiece W is bent in the first direction F1.
(6) As shown in FIG. 11, the workpiece W is moved to the other side (rear side) of the forming mandrels 61 and 161 by the robot arm 34.
(7) As show in FIG. 12, the workpiece W is fixed to the support portions 72 and 172 of the forming mandrels 61 and 161 by the holding members 63 and 163. Simultaneously, the forming mandrels 61 and 161 are supported by the holding members 62 and 162.
(8) The bending rollers 65 and 165 are moved along the arc-shaped forming portions 70 and 170, respectively, and the workpiece W is bent in the second direction F2.

Note that, when a stabilizer has a plurality of bent portions located at different distances from an eye portion, the bent portion close to the eye portion is bent first, and the bent portion far from the eye portion is bent next. When a pair of bilaterally symmetrical bent portions are bent, the bent portions at two positions may be simultaneously bent by a pair of forming mandrels.
(9) The workpiece W is removed from the forming mandrels 61 and 161.
(10) In the eye portion forming process ST3 shown in FIG. 4, the eye portions 18 and 19 are bent at angles θ1 and θ2 (shown in FIG 2) by eye portion dies.
(11) The workpiece W is set to, for example, an electric current heating electrode as the heating means.
(12) In the reheating process ST4 shown in FIG. 4, current is applied to the workpiece W through the electrode. Accordingly, the workpiece W is heated to a temperature at which quenching can be carried out. Note that the workpiece W may be heated by a heating furnace.
(13) In the quenching process ST5 shown in FIG. 4, quenching is carried out by putting the heated workpiece W in a coolant.

According to the stabilizer manufacturing device and manufacturing method of the present embodiment, a stabilizer having a plurality of bent portions having different radii of curvature can be efficiently manufactured. In addition, in the warm forming range of less than the A1 point, roller bending is carried out using the forming mandrel having the arc-shaped surface and the bending roller. Therefore, problems such as scales on the surface of the stabilizer and decarburization can be prevented from occurring, and so-called scale defects can be prevented from occurring. In addition, as compared with the case of cold forming, deformation resistance is low, and bent portions having high shape accuracy can be relatively easily formed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A stabilizer manufacturing device comprising:
a first forming unit; and
a second forming unit, wherein
the first forming unit comprises:
a first forming mandrel including a first forming portion having an arc shape when viewed from above, a front support portion which supports a workpiece, and a rear support portion which supports the workpiece;

a first front holding member which clamps the workpiece between the first front holding member and the first forming mandrel;
a first rear holding member which clamps the workpiece between the first rear holding member and the first forming mandrel; and
a first bending roller which revolves along the first forming portion, and
the second forming unit comprises:
a second forming mandrel including a second forming portion having an arc shape when viewed from above, a front support portion which supports the workpiece, and a rear support portion which supports the workpiece;
a second front holding member which clamps the workpiece between the second front holding member and the second forming mandrel;
a second rear holding member which clamps the workpiece between the second rear holding member and the second forming mandrel; and
a second bending roller which revolves along the second forming portion.

2. The stabilizer manufacturing device of claim 1, wherein the first forming mandrel and the second forming mandrel are bilaterally symmetrical.

3. The stabilizer manufacturing device of claim 1, wherein
the first forming unit and the second forming unit are movable along guide members extending in a horizontal direction,
further comprising:
a first unit drive mechanism for moving the first forming unit; and
a second unit drive mechanism for moving the second forming unit.

4. The stabilizer manufacturing device of claim 1, wherein
first forming portion has a large-diameter arc-shaped surface having a first radius of curvature, and a small-diameter arc-shaped surface having a second radius of curvature smaller than the first radius of curvature, and
the second forming portion has a large-diameter arc-shaped surface having the first radius of curvature, and a small-diameter arc-shaped surface having the second radius of curvature.

5. The stabilizer manufacturing device of claim 4, wherein
the first forming mandrel and the second forming mandrel are movable in a vertical direction,
further comprising:
a first lifting/lowering mechanism which moves the first forming mandrel so that the large-diameter arc-shaped surface or the small-diameter arc-shaped surface of the first forming mandrel is located at a same height as the first bending roller; and
a second lifting/lowering mechanism which moves the second forming mandrel so that the large-diameter arc-shaped surface or the small-diameter arc-shaped surface of the second forming mandrel is located at a same height as the second bending roller.

6. The stabilizer manufacturing device of claim 1, further comprising:

a first front actuator which moves the first front holding member toward the first forming mandrel;
a first rear actuator which moves the first rear holding member synchronously and simultaneously with the first front holding member toward the first forming mandrel;
a second front actuator which moves the second front holding member toward the second forming mandrel; and
a second rear actuator which moves the second rear holding member synchronously and simultaneously with the second front holding member toward the second forming mandrel.

7. The stabilizer manufacturing device of claim 1, wherein
a circumferential surface of the first bending roller has a groove according to a diameter of the workpiece, and
a circumferential surface of the second bending roller has a groove according to the diameter of the workpiece.

8. The stabilizer manufacturing device of claim 1, further comprising:
a robot arm having a holding portion which holds and moves the workpiece, wherein
the robot arm arranges the workpiece on a front side of the first forming mandrel and the second forming mandrel when the workpiece is bent in a first direction, and
the robot arm moves the workpiece to a rear side of the first forming mandrel and the second forming mandrel when the workpiece is bent in a second direction.

9. The stabilizer manufacturing device of claim 8, wherein the robot arm sets the workpiece on the front side or the rear side of the first forming mandrel and the second forming mandrel by rotating the workpiece about an axis of the workpiece according to a direction in which the workpiece is bent.

10. A method for manufacturing a stabilizer comprising:
heating a steel workpiece as a material of the stabilizer to a temperature suitable for warm working, the temperature suitable for warm working being a temperature lower than an A1 point;
setting the heated workpiece to a forming mandrel including a forming portion including a plurality of arc-shaped surfaces having different radii of curvature;
fixing the workpiece to the forming mandrel by a holding member;
bending the workpiece to a radius of curvature according to an arc-shaped surface selected from among the arc-shaped surfaces of the forming portion by moving a rotatable bending roller along the selected arc-shaped surface;
reheating the workpiece to a temperature at which quenching can be carried out; and
quenching the workpiece by cooling the reheated workpiece in a coolant.

11. The method for manufacturing the stabilizer of claim 10, wherein when the workpiece is set to the forming mandrel, the workpiece is rotated about an axis of the workpiece by a robot arm according to a direction in which the workpiece is bent.

* * * * *